United States Patent
Mazza et al.

(10) Patent No.: US 7,200,880 B2
(45) Date of Patent: Apr. 10, 2007

(54) SYSTEM FOR A MULTIPLACE COTS STRUCTURE

(76) Inventors: Tommaso Mazza, Via Armando Diaz 8, 64100 Teramo (IT); Alfredo Salerni, Via Cesare Averardi 5, 64100 Teramo (IT)

( * ) Notice: Subject to any disclaimer, the term of this patent is extended or adjusted under 35 U.S.C. 154(b) by 0 days.

(21) Appl. No.: 10/516,290

(22) PCT Filed: May 31, 2002

(86) PCT No.: PCT/IT02/00352

§ 371 (c)(1),
(2), (4) Date: Aug. 11, 2005

(87) PCT Pub. No.: WO03/101256

PCT Pub. Date: Dec. 11, 2003

(65) Prior Publication Data

US 2006/0143824 A1    Jul. 6, 2006

(51) Int. Cl.
*A47C 19/00* (2006.01)

(52) U.S. Cl. .................. 5/9.1; 5/2.1; 5/53.1; 5/285; 5/282.1

(58) Field of Classification Search ............ 5/9.1, 5/8, 2.1, 201, 200.1, 202, 286, 285, 282.1; 24/457, 458; 52/656.9, 655.1; 312/111, 312/140
See application file for complete search history.

(56) References Cited

U.S. PATENT DOCUMENTS

| | | | | |
|---|---|---|---|---|
| 318,282 A * | 5/1885 | Moore | ........................... | 5/132 |
| 2,853,716 A * | 9/1958 | Sevcik | ............................. | 5/8 |
| 3,316,564 A * | 5/1967 | Rogers, Jr. | ..................... | 5/9.1 |
| 3,398,981 A * | 8/1968 | Vincens | ..................... | 403/388 |
| 3,886,604 A * | 6/1975 | Ewing | ............................. | 5/8 |
| 5,263,210 A * | 11/1993 | Pollard | ......................... | 5/9.1 |
| 5,522,101 A * | 6/1996 | Yeh | .............................. | 5/9.1 |
| 5,540,491 A * | 7/1996 | Wu | ........................... | 312/237 |
| 5,572,751 A * | 11/1996 | Brandt | ......................... | 5/9.1 |
| 5,729,948 A * | 3/1998 | Levy et al. | ................ | 52/656.9 |
| 5,829,074 A * | 11/1998 | Fisher | ........................... | 5/9.1 |
| 6,088,989 A * | 7/2000 | Matsu et al. | ............... | 52/655.1 |
| 6,948,198 B1 * | 9/2005 | Eldersveld | ..................... | 5/132 |

FOREIGN PATENT DOCUMENTS

FR       2 514 841 A    4/1983

* cited by examiner

*Primary Examiner*—Patricia Engle
*Assistant Examiner*—Jonathan Liu
(74) *Attorney, Agent, or Firm*—Browdy and Neimark, PLLC

(57) ABSTRACT

A system for implementing a modular structure having two or more cot places, characterised in that the modular structure is implemented by the mutual interconnection of single units (1) made of a pair of posts (2) and of at least one crosspiece (3) assembled in a sandwich arrangement blocked in position by fastening means (4). The system has the main advantage of providing a variable structural modularity to assume a plurality of different conditions, both with regard to the combinability thereof in terms of number of cot places and with regard to the overall dimensions thereof, while maintaining the same number of cot places, according to the varying of the user's needs over time.

11 Claims, 3 Drawing Sheets

SYSTEM FOR A MULTIPLACE COTS STRUCTURE

The present invention refers to a system for implementing a multiplace cots structure of the type having a variable morphology wherein it is provided a plurality of longitudinal beams of a fixed size and apt to be assembled each to the other, needwise, in different arrangements to generate different arrangements of cots.

Multiplace cots structures are already known to the state of the art, typically providing a first load bearing structure to which there are made integral different transverse members supporting a respective cot seat and that generate likewise respective cot places. Typically, these structures provide two, three, and at times four cot places, arranged in a vertical stacked manner.

Such multiplace cots structures, though very practical and easy to manufacture, entail a first drawback of foreseeing no modularity whatsoever with regard to the possibility of arranging the same number of cots in different arrangements, side-by-side as well as stacked.

Moreover, a second drawback lies in that they do not provide, for a fixed number of cot place a variable size according to the needs and spaces available to the user.

Therefore, object of the present invention is to overcome the abovementioned drawbacks providing a multiplace cots structure which foresees a structural modularity in order to allow the same to assume a plurality of different arrangements, with regard both to its combinability in terms of number of cot places and to its overall size for a fixed, number of available cot places.

Another object of the present invention is to provide a multiplace cots structure which foresees the possibility of assuming different combinations according to the varying of the user's needs over time and allowing the user to keep the same number of modular units.

Hence, the present invention provides a system for implementing a modular structure with two or more cot places according to Claim 1.

The system of the present invention will hereinafter be better illustrated by the detailed description of a preferred embodiment thereof, given by way of a non-limiting example, making reference to the attached drawings, wherein.

Figure 1:
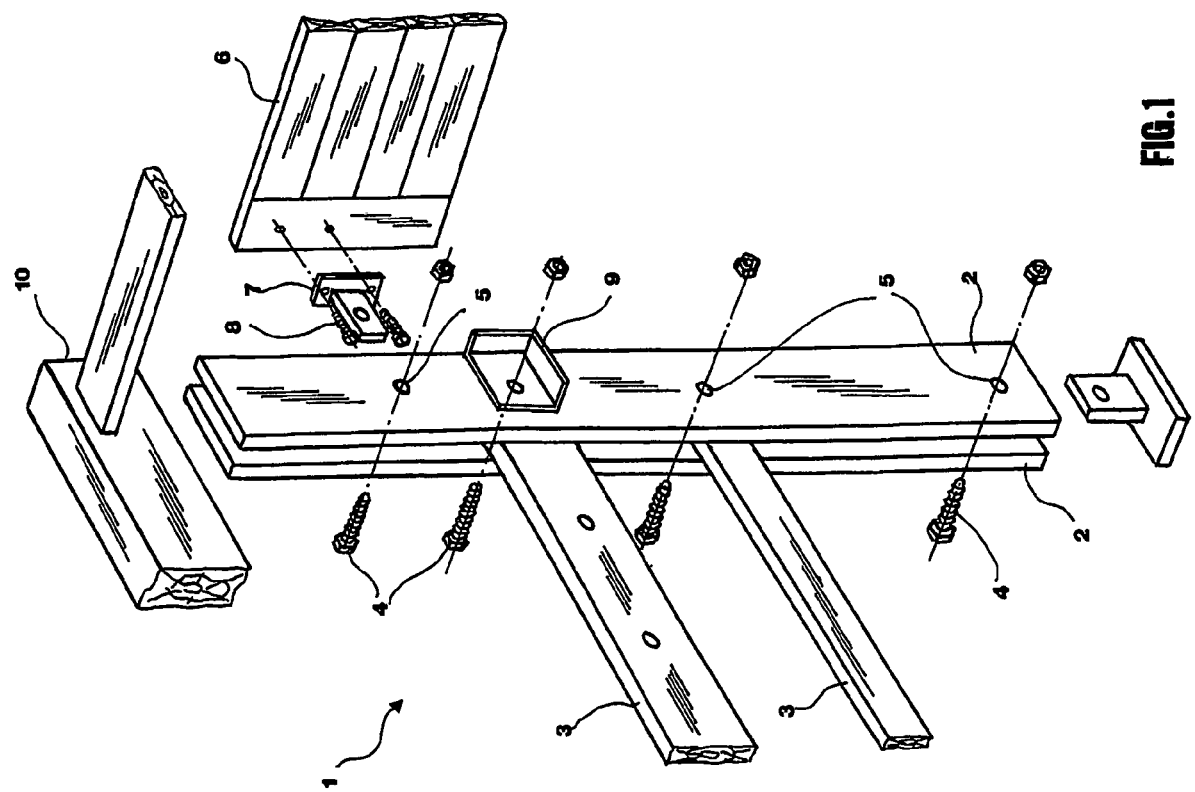
FIG. 1 is an exploded partial view of a single unit forming the system to make a modular structure with two or more cot places according to the present invention.
Figure 3:
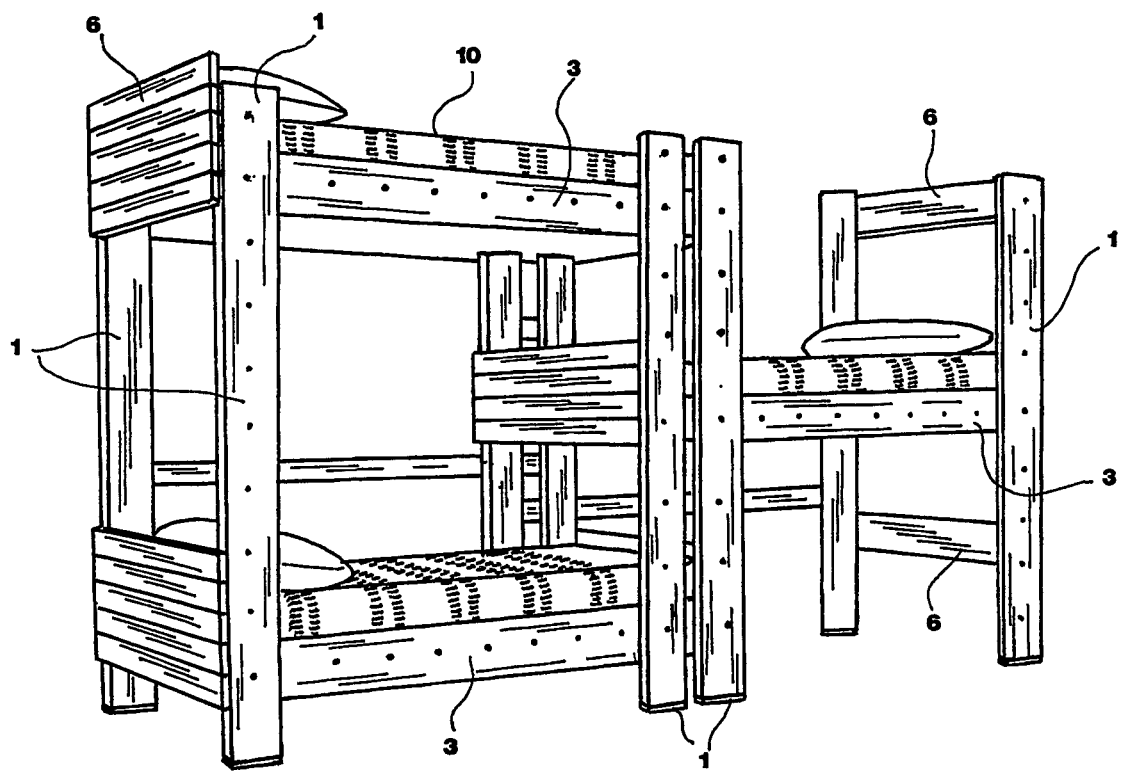
FIG. 3 is a perspective view of an arrangement of a modular structure having three cot places according to the system of the present invention.
Figure 4:
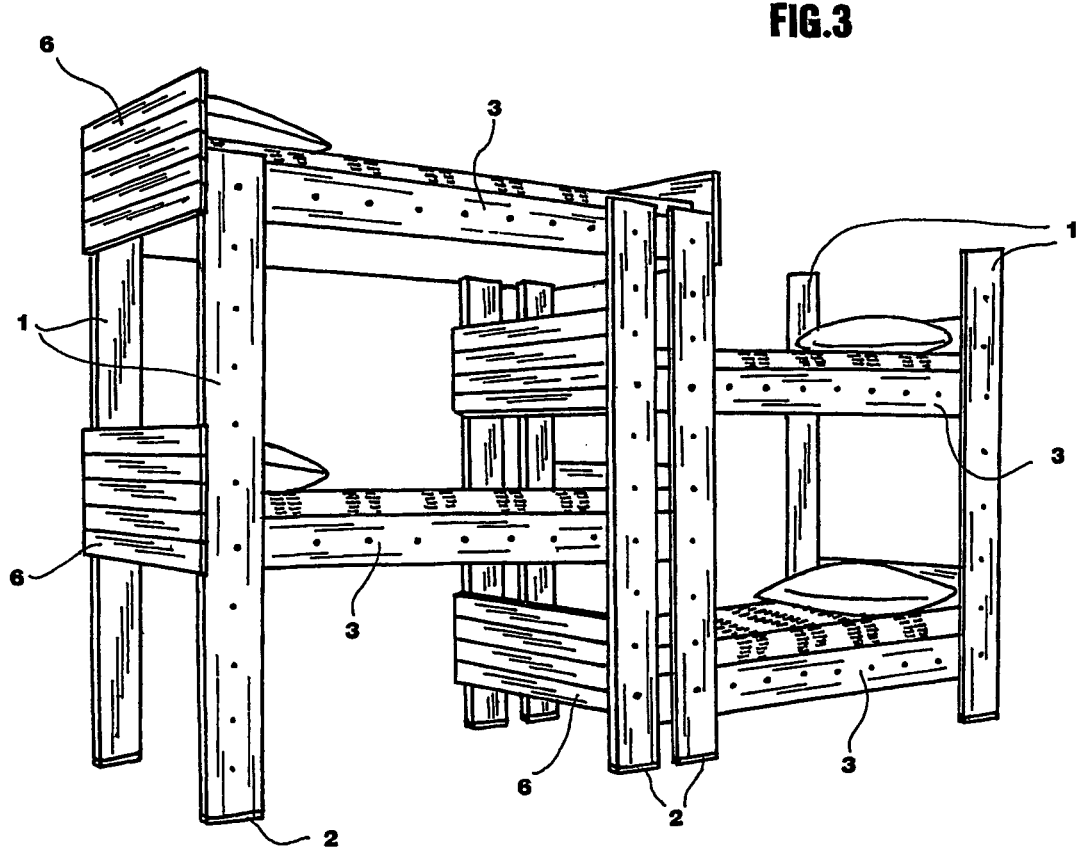
FIG. 4 is a perspective view of a modular structure having four cot places according to the system of the present invention.

With reference now to FIG. 1, the structure of a single unit for implementing the system according to the present invention is illustrated.

More precisely, a single unit 1 is made of a pair of posts 2 of a substantially parallelepiped shape, which may be manufactured in a solid or in a boxed material. Moreover, the single unit 1 provides that between the two posts there may be mounted in a locked manner a plurality of girders 3 (or more simply, crosspieces 3), that are blocked in position by virtue of blocking means as bolts 4 or the like, and apt to be inserted in a respective plurality of blocking regions 5 obtained on each post 2 as well as on each crosspiece 3.

Thus, it is provided that a pair of posts 2 may block therebetween a respective plurality of crosspieces 3, thereby implementing a sandwich structure.

On the other hand, the present invention provides a further plurality of head members 6 of a substantially plane and rectangular shape, apt to be blocked between two single units 1 so as to implement the distance for the cot seat between two posts 1.

Figure 2:
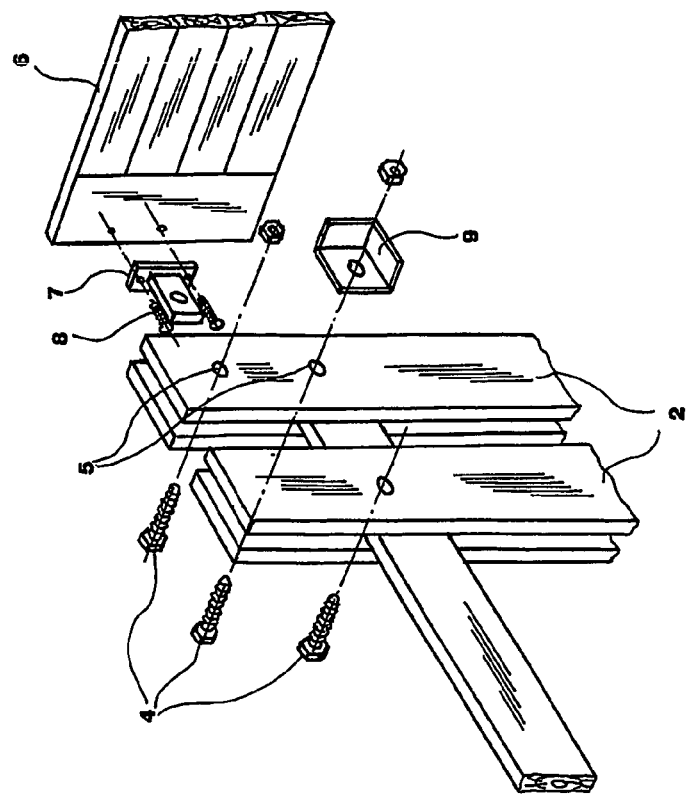
FIG. 2 is an exploded partial view of a detail of a modular structure according to the system of the present invention.

With particular reference now to FIG. 2, for the blocking of each head member 6 onto the single units 1 it is provided a respective blocking member 7, shaped as a rectangular drilled flathead pin apt to be mounted between the two posts 2 of the unit 1 and to be blocked therein by a respective pin 4 in a respective blocking region 5. Subsequently to the fitting of the pin 7 into the unit 1, the former is made integral to the head member 6 by screws or pins 8 or the like.

Moreover, the invention further provides a respective plurality of substantially C-shaped supporting members 9 for supporting a corner region of a respective bed structure 10 in the already known manner.

Each supporting member 9 is apt to be removably mounted on a respective post 2, and to be blocked in a blocking region 5 with a suitable pin 4.

With reference now to FIGS. 3 to 6, different embodiments of multiplace cots structures according to the system of the present invention are illustrated.

As it is apparent from the figures, according to the system of the present invention modular structures can advantageously be implemented in which there can be arranged cots in a side-by-side or stacked condition, varying the extension or the size thereof in the direction of the length of the structure, without however modifying the overall size of the cot places.

Figure 5:
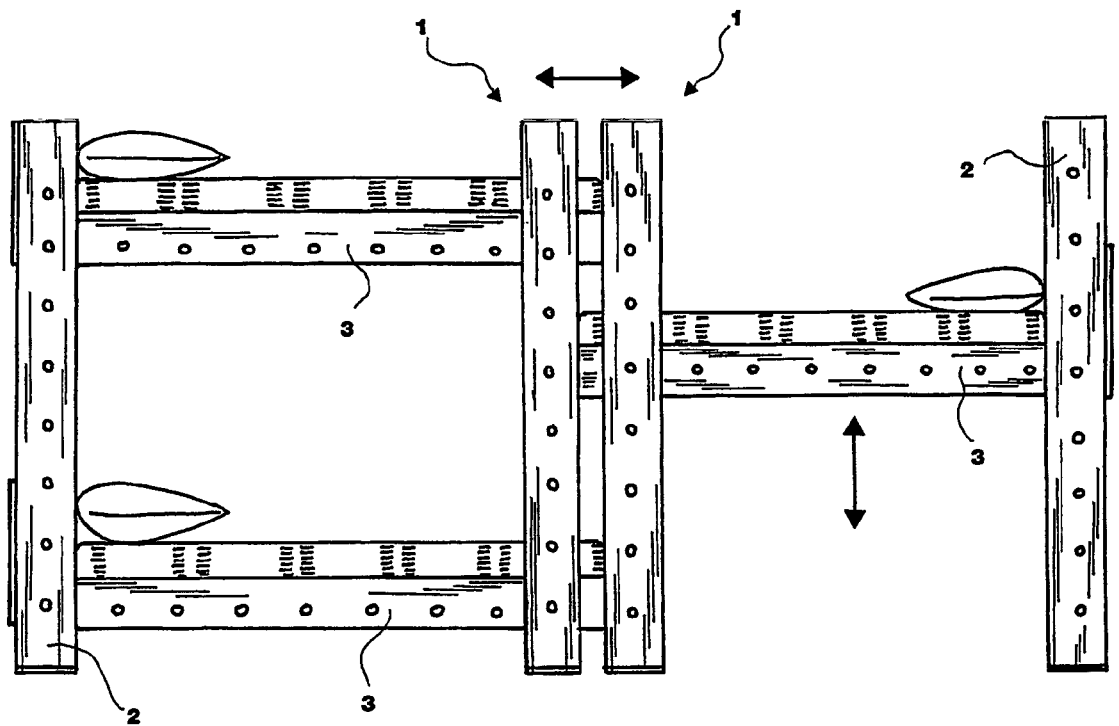
FIG. 5 is a front elevational view of a modular structure having three cot places in a first condition.
Figure 6:
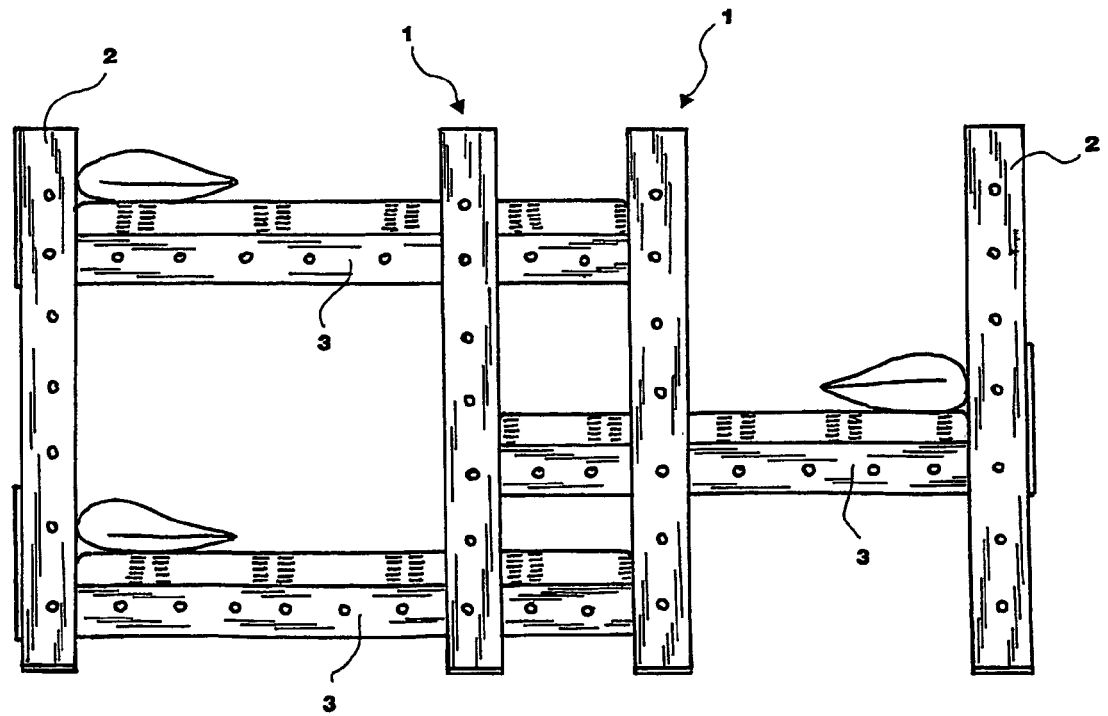
FIG. 6 is a front elevational view of a modular structure having three cot places in a second condition.

More precisely, as it is apparent from FIGS. 5 and 6, according to the user's needs it is possible to vary both the height from the floor of each cot, by changing the fastening position of the supporting members 9 in the blocking regions 5, and the overall dimensions of the multiplace cots structure in the longitudinal direction, changing the blocking position of the girders 3 onto the posts 2.

The present invention entails several advantages. A first advantage lies in that the system meets the needs of all users, according to the space available thereto, for any arrangement and number of cot places.

A second advantage lies in that the same number of cot places can be maintained, changing however the overall dimensions of the modular structure assembled according to the system of the present invention.

A further advantage lies in that the present invention is not limited to the abovedescribed embodiments. E.g., single units 1 can have any shape or can be made of any suitable material still maintaining this function.

The invention claimed is:

1. A system for implementing a modular structure having two or more cots comprising:
    a plurality of posts (2), a plurality of crosspieces (3), and a plurality of head members (6), characterized in that said modular structure is implemented by a mutual interconnection of single units (1), each single unit comprising a pair of posts (2) and at least one crosspiece (3) assembled in a sandwich arrangement with said pair of posts and blocked in position by fastening means (4), wherein each head member of said plurality of head members is a substantially rectangular-shaped plane member (6) apt to be blocked between two single units (1) by a first blocking means (7, 8), wherein said first blocking means comprises an anchoring member (7) apt to be assembled between said pair of posts (2) of a single unit (1) in a sandwich arrangement with said pair of posts.

2. The system for implementing a modular structure having two or more cots according to claim 1, further comprising a supporting means (9) of a respective cot seat and removably assembled on said single unit (1).

3. The system for implementing a modular structure having two or more cots according to claim 1, wherein each post (2) of said plurality of posts (2) has a plurality of blocking regions (5) apt to cooperate with said fastening means for the mutual interconnection of said single units (1).

4. The system for implementing a modular structure having two or more cots according to claim 3, wherein each post (2) of said plurality of posts (2) and each crosspiece (3) of said plurality of crosspieces (3) is made of a rectangular-sectioned beam.

5. The system for implementing a modular structure having two or more cots according to claim 3, wherein each crosspiece (3) of said plurality of crosspieces (3) has a plurality of blocking regions (5) apt to cooperate with said fastening means for the mutual interconnection of said single units (1).

6. The system for implementing a modular structure having two or more cots according to claim 5, wherein each crosspiece (3) of said plurality of crosspieces (3) has a rectangular cross-section.

7. The system for implementing a modular structure having two or more cots according to claim 3, wherein each post (2) of said plurality of posts (2) has a rectangular cross-section.

8. The system for implementing a modular structure having two or more cots according to claim 1, wherein each crosspiece (3) of said plurality of crosspieces (3) has a plurality of blocking regions (5) apt to cooperate with said fastening means for the mutual interconnection of said single units (1).

9. The system for implementing a modular structure having two or more cots according to claim 8, wherein each crosspiece (3) of said plurality of crosspieces (3) has a rectangular cross-section.

10. The system for implementing a modular structure having two or more cots according to claim 8, wherein each post (2) of said plurality of posts (2) has a rectangular cross-section.

11. The system for implementing a modular structure having two or more cots according to claim 1, wherein each post (2) of said plurality of posts (2) has a rectangular cross-section.

* * * * *